I. M. SCHWAB.
NOSE GRIP.
APPLICATION FILED JULY 5, 1921.
1,412,542.
Patented Apr. 11, 1922.
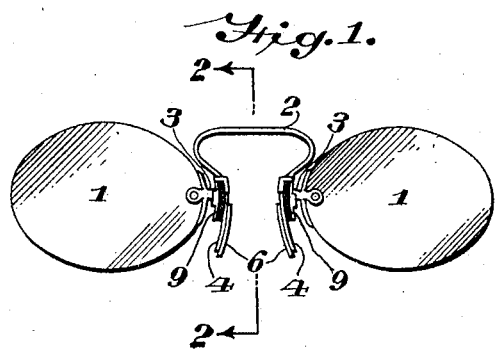
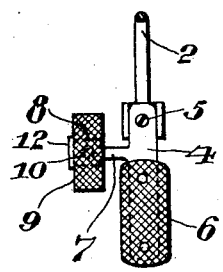
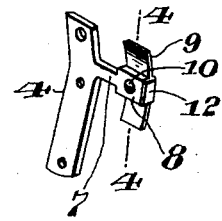
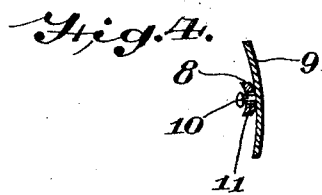
INVENTOR.
Isaac M. Schwab
BY
Cyrus N. Anderson
ATTORNEY.

UNITED STATES PATENT OFFICE.

ISAAC M. SCHWAB, OF SAVANNAH, GEORGIA.

NOSE GRIP.

1,412,542.  Specification of Letters Patent.  Patented Apr. 11, 1922.

Application filed July 5, 1921. Serial No. 482,384.

*To all whom it may concern:*

Be it known that I, ISAAC M. SCHWAB, a citizen of the United States, and a resident of Savannah, in the county of Chatham and State of Georgia, have invented an Improvement in Nose Grips, of which the following is a specification.

My invention relates to nose grips for eyeglasses, particularly to grips of the character in which the nose gripping or pad portions have pivotal or rocking connection with their supports.

I have shown my invention as applied to or embodied in the construction of the pads or grips which are adapted to grip the nose of a wearer at points adjacent the inner or nasal canthi, although it may be embodied in the construction of pads situated at other points of the nose gripping members.

One of the objects of my invention is to provide means which will permit the necessary rocking and automatic adjusting movements of a nose gripping pad, but which will retain the said pad in proper position and in proper relation to its support.

A further object of the invention is to provide a pad with means for shielding the end of the arm or support by means of which it is supported so as to prevent rough or cutting edges from contacting with the nose of the wearer.

Other objects and advantages of my invention will be pointed out in the detailed description thereof which follows or will be apparent from such description.

In order that the invention may be readily understood and its practical advantages fully appreciated, reference should be had to the accompanying drawing in which I have illustrated one form of embodiment thereof; but it will be understood that changes in the details of construction may be made within the scope of the claims without departing from the said invention.

In the drawing:

Fig. 1 is a view in rear elevation of a pair of eyeglasses provided with nose gripping members embodying my invention;

Fig. 2 is a transverse sectional view taken on the line 2—2 of Fig. 1;

Fig. 3 is a perspective view of a nose gripping member embodying my invention;

Fig. 4 is a transverse sectional view taken on the line 4—4 of Figs. 2 and 3; and Fig. 5 is a perspective view of a nose gripping pad embodying my invention.

Referring to the drawing: 1 designates the lenses of a pair of eyeglasses and 2 the spring bridge connecting the same. The opposite ends of the spring bridge 2 are secured in slots or housings in the inner ends of the posts or standards 3 of usual construction. In the construction as shown the nose gripping members comprise the vertical portions 4, the upper ends of which are secured in the slots or housings previously mentioned by means of screws 5. The lower end portions of these vertical parts are provided with pad coverings 6 of celluloid or other suitable material.

Projecting from the rear edges of the upper end portions of the vertical parts 4 of the nose gripping members are arms 7 which terminate at their rear ends in slightly widened head portions 8 which are curvilinear in cross section so that the inner surfaces thereof are convex, as is clearly shown in Fig. 4. The pads 9 which are adapted to grip the upper portion of the nose structure inwardly of the inner canthi are rockingly mounted upon the slightly widened head portions 8 by means of pivots 10 of rivet form which extend through openings 11 through the head portions 8. These pivots are secured by soldering or otherwise to the gripping pads 9 and after having been inserted through the openings 11 are up-set in order that they may be retained in position upon the outer end portions of the said rearwardly extending arms 7. In upsetting the ends of these pivots care should be taken that the pads 9 shall not be clamped tightly and rigidly against the head portions 8, because it is desired that these pads shall rock upon the convex inner surfaces of these heads and thereby adjust themselves to the nose of the wearer. Furthermore in order that these rocking and self-adjusting movements may be effected, the openings 11 are of greater diameter than that of the pivots 10.

In order to protect the outer ends of the arms 7 and prevent the same from contacting with the nose of the wearer, I have provided the laterally and outwardly extending projections 12 which are secured to the rear edges of the gripping pads 9. These projections extend over the rear ends of the arms 7, as clearly shown in Fig. 3 of the drawing, and not only serve the purpose or function previously referred to but also prevent the pads 9 from turning to too great an extent upon their pivots. In other words, while it is desired that the pads 9 shall have loose connection with the arms 7, it is necessary that they be retained in positions extending transversely of the said arms, at right angles or very nearly at right angles thereto. It will be seen that the outwardly and laterally extending projections 12 which are situated in close proximity to the outer ends of the arms 7 will prevent the turning of the pads 9 except to a small extent, sufficient to permit the automatic adjustment thereof hereinbefore referred to.

Although I have shown my invention as embodied in a pair of eyeglasses in which the nose gripping members are rigidly secured to the posts or standards 3, it will be understood that my invention may be embodied in other types of eyeglasses, such for instance as those commonly known as finger piece eyeglasses. It will also be understood that my invention is applicable to and may be embodied in nose gripping members of substantially different construction and appearance from the nose gripping member which is disclosed in the drawing.

The essential feature of my invention is that the nose grips which are adapted to contact with and grip the nose of a wearer are not only rockingly supported so as to be self-adjusting as above described, but also comprise means whereby the sharp outer edges or ends of the supporting means may be shielded to thereby prevent contact of the same with the nose of the wearer.

One advantage of a construction such as is illustrated is that if the pivots 10 should wear so as to become too loose in their openings 11 the connections of the pads 9 to the enlarged head portions 8 of the arms 7 may be tightened merely by up-setting the outer ends of the pivots to a greater extent.

Having thus described my invention, what I claim and desire to secure by Letters Patent is:

1. A nose gripping member for eyeglasses, comprising a nose gripping pad pivotally connected to the inner face of a supporting arm, and means independent of the pivot connection and carried by said pad for shielding an edge portion of the said arm.

2. A nose gripping member for eyeglasses, comprising a pad adapted to contact with the upper portion of the nose inwardly of the inner canthis of an eye of a wearer, a support for said pad, and means for rockingly securing said pad to said support and the said pad being provided with an outwardly and laterally extending projection for shielding an edge portion of the said support to prevent the same from contacting with the nose, said projection being separate from and independent of said securing means.

3. In eyeglasses, nose gripping members comprising upper and lower nose gripping pad portions, rearwardly extending arms for supporting the upper pads, and means for rockingly connecting the said pads to the said arms, and said pads being provided with outwardly and laterally extending projections which extend over the rear ends of the said arms, substantially as and for the purpose described.

4. In eyeglasses, nose gripping members comprising rearwardly extending arms, the inner surfaces of the outer end portions of which are convex, the said outer end portions being provided with holes extending therethrough, nose gripping pads rockingly connected to the outer end portions of said arms, said pads resting against the convex inner surfaces of said arms, and the said pads being provided with pivot pins extending outwardly therefrom and through the said openings, which pivot pins are up-set for the purpose of retaining the said pads in position upon the said arms, and each of the said pads being provided with outwardly and laterally extending projections which overlie the rear ends of the said arms, substantially as described.

5. A nose grip, comprising lower and upper pad portions, the lower pad being adapted to occupy a position substantially in the plane of the lenses of a pair of eyeglasses, a rearwardly extending arm constituting a part of the said nose gripping member, said arm having an opening through its outer end portion, and the upper nose gripping pad of the said nose gripping member having a pivot pin projecting outwardly therefrom which pin extends through the said opening and is loosely secured therein for rockingly connecting the said pad to the said arm, and the said pad being provided with a laterally and outwardly extending projection which is adapted to extend over the rear end of the said arm.

6. A nose gripping member for eyeglasses comprising an arm, a pad extending transversely of the inside surface of said arm, and a rivet for rockingly connecting the pad to said arm adjacent its end, the said pad having a lateral projection which extends over the adjacent end of said arm, substantially as and for the purpose described.

In testimony that I claim the foregoing as my invention, I have hereunto subscribed my name this 31st day of May, 1921.

ISAAC M. SCHWAB.